United States Patent
Liu et al.

(10) Patent No.: US 10,951,395 B2
(45) Date of Patent: Mar. 16, 2021

(54) DATA FETCHING IN DATA EXCHANGE NETWORKS

(71) Applicant: FUJITSU LIMITED, Kawasaki (JP)

(72) Inventors: Lei Liu, San Jose, CA (US); Wei-Peng Chen, Fremont, CA (US)

(73) Assignee: FUJITSU LIMITED, Kawaskai (JP)

( * ) Notice: Subject to any disclaimer, the term of this patent is extended or adjusted under 35 U.S.C. 154(b) by 234 days.

(21) Appl. No.: 16/105,770

(22) Filed: Aug. 20, 2018

(65) Prior Publication Data

US 2020/0059353 A1 Feb. 20, 2020

(51) Int. Cl.
H04L 9/06 (2006.01)
H04L 29/08 (2006.01)
G06F 16/18 (2019.01)

(52) U.S. Cl.
CPC ........ H04L 9/0637 (2013.01); G06F 16/1865 (2019.01); H04L 9/0643 (2013.01); H04L 67/06 (2013.01)

(58) Field of Classification Search
CPC ..... H04L 9/0637; H04L 9/0643; H04L 67/06; G06F 16/1865
See application file for complete search history.

(56) References Cited

U.S. PATENT DOCUMENTS

| | | | | |
|---|---|---|---|---|
| 7,647,329 B1* | 1/2010 | Fischman | ............. | G06F 3/0607 707/999.1 |
| 8,200,630 B1* | 6/2012 | Park | ..................... | G06F 16/172 707/638 |
| 8,676,760 B2* | 3/2014 | Shen | .................... | G06F 11/2097 707/640 |
| 8,850,528 B2* | 9/2014 | Van Biljon | ......... | G06F 21/6218 726/4 |
| 10,448,251 B1* | 10/2019 | Maria | .................... | H04L 9/3239 |
| 10,554,401 B1* | 2/2020 | Lee | ....................... | G06K 7/1417 |
| 2002/0133491 A1* | 9/2002 | Sim | ...................... | H04L 67/1023 |
| 2002/0170052 A1* | 11/2002 | Radatti | ................. | G06F 21/564 717/171 |
| 2006/0190715 A1* | 8/2006 | Miller | ................. | H04L 63/0428 713/150 |

(Continued)

OTHER PUBLICATIONS

NPL Search (Google Scholar) (Year: 2020).*

*Primary Examiner* — Samson B Lemma
*Assistant Examiner* — Richard W Cruz-Franqui
(74) *Attorney, Agent, or Firm* — Maschoff Brennan

(57) ABSTRACT

A method may include receiving a request to obtain a data file from a nearest remote computing system in a blockchain network and requesting a transaction history of the data file from the blockchain network. The method may also include determining the nearest remote computing system to the requesting computing system based on the transaction history, where the nearest remote computing system stores a copy of the transaction history and the data file and determining the data file stored on the nearest remote computing system is the same as the requested data file by comparing a first hash value associated with the requested data file to a second hash value associated with the data file stored on the nearest remote computing system. The method may also include receiving the requested data file from the nearest remote computing system; and sending the requested data file to the requesting computing system.

16 Claims, 6 Drawing Sheets

(56) References Cited

U.S. PATENT DOCUMENTS

| | | | |
|---|---|---|---|
| 2007/0156842 A1* | 7/2007 | Vermeulen | H04L 29/06047 709/217 |
| 2010/0198849 A1* | 8/2010 | Thomas | G06F 16/2358 707/758 |
| 2010/0299722 A1* | 11/2010 | Tewari | H04L 67/101 726/3 |
| 2011/0246503 A1* | 10/2011 | Bender | G06F 16/258 707/769 |
| 2012/0151206 A1* | 6/2012 | Paris | H04L 9/3234 713/155 |
| 2012/0179814 A1* | 7/2012 | Swildens | H04L 67/1002 709/224 |
| 2013/0066901 A1* | 3/2013 | Marcelais | G06F 16/137 707/769 |
| 2014/0289862 A1* | 9/2014 | Gorfein | G06F 21/16 726/26 |
| 2015/0244690 A1* | 8/2015 | Mossbarger | H04L 9/006 713/171 |
| 2016/0006645 A1* | 1/2016 | Rave | H04L 12/2854 709/203 |
| 2016/0300223 A1* | 10/2016 | Grey | G06F 21/6245 |
| 2016/0371495 A1* | 12/2016 | Bhat | G06F 21/445 |
| 2017/0118301 A1* | 4/2017 | Kouru | H04L 67/06 |
| 2017/0257358 A1* | 9/2017 | Ebrahimi | H04L 9/3247 |
| 2017/0329980 A1* | 11/2017 | Hu | G06F 21/78 |
| 2018/0004766 A1* | 1/2018 | Darling | G06F 16/137 |
| 2018/0091484 A1* | 3/2018 | Atta | H04L 9/3247 |
| 2018/0183587 A1* | 6/2018 | Won | H04L 9/0891 |
| 2018/0287893 A1* | 10/2018 | O'Brien | H04M 15/66 |
| 2018/0302222 A1* | 10/2018 | Agrawal | H04W 4/70 |
| 2018/0322491 A1* | 11/2018 | Madisetti | G06Q 20/389 |
| 2019/0019169 A1* | 1/2019 | McLaughlin | G06Q 20/3224 |
| 2019/0050541 A1* | 2/2019 | Wright | H04L 9/3247 |
| 2019/0057379 A1* | 2/2019 | Chalakudi | G06Q 20/38215 |
| 2019/0179948 A1* | 6/2019 | Benjamin-Deckert | G06F 16/86 |
| 2019/0180307 A1* | 6/2019 | Cohen | G06Q 20/3255 |
| 2019/0188699 A1* | 6/2019 | Thibodeau | G06Q 20/3827 |
| 2019/0188700 A1* | 6/2019 | August | H04L 9/3239 |
| 2019/0188701 A1* | 6/2019 | Parsons | H04L 9/3239 |
| 2019/0280863 A1* | 9/2019 | Meyer | H04L 9/006 |
| 2019/0319939 A1* | 10/2019 | Hamel | H04L 9/3226 |
| 2019/0385130 A1* | 12/2019 | Mossoba | G06Q 20/3224 |
| 2020/0005290 A1* | 1/2020 | Madisetti | G06Q 20/389 |
| 2020/0067907 A1* | 2/2020 | Avetisov | H04L 9/3218 |
| 2020/0153626 A1* | 5/2020 | Guan | H04L 9/3239 |
| 2020/0162485 A1* | 5/2020 | Jevans | G06F 16/955 |

\* cited by examiner

DATA FETCHING IN DATA EXCHANGE NETWORKS

FIELD

The embodiments discussed in the present disclosure are related to data fetching in data exchange networks.

BACKGROUND

One of the major disadvantages in internet protocol (IP) networking is obtaining data based on the IP address. The desired data may be available at multiple locations, but the requester may be unaware of the location. As a result, the requester may first identify a destination IP address in order to request the data, and the requested IP address may be far away from the requester's location.

Current solutions include using a content delivery network (or content distribution network) (CDN), which is a group of geographically distributed and interconnected servers that provide cached internet content from a network location closest to a user in order to accelerate the content's delivery. CDN users, however, tend to be relatively large content owners who are willing to pay more for higher performance delivery of content to customers. In addition, CDNs run into other potential issues. For example, potential CDN issues may include how to get customer content requests into the CDN system, how to map each request to the nearest CDN node serving the content, or how to guarantee data security when CDN is the middleman.

Other systems attempt to address the issues by using name-based routing, as done by content centric networking (CCN) and named data networking (NDN). However, CCN and NDN systems have not fully solved the problems. For example, NDN systems may have difficulty finding the closest neighboring system from which to fetch the requested data.

The subject matter claimed in the present disclosure is not limited to embodiments that solve any disadvantages or that operate only in environments such as those described above; rather, this background is only provided to illustrate one example technology area where some embodiments described in the present disclosure may be practiced.

SUMMARY

According to an aspect of an embodiment, a method may include receiving a request to obtain a data file from a nearest remote computing system in a blockchain network, the nearest remote computing system being nearest to the requesting computing system. The method may further include requesting a transaction history of the data file from the blockchain network. The method may further include determining the nearest remote computing system to the requesting computing system based on the transaction history, where the nearest remote computing system stores a copy of the transaction history and the data file. The method may further include receiving the requested data file from the nearest remote computing system. The method may further include determining the data file stored on the nearest remote computing system is the same as the requested data file by comparing a first hash value associated with the requested data file to a second hash value associated with the data filed stored on the nearest remote computing system. The method may further include sending the requested data file to the requesting computing system.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
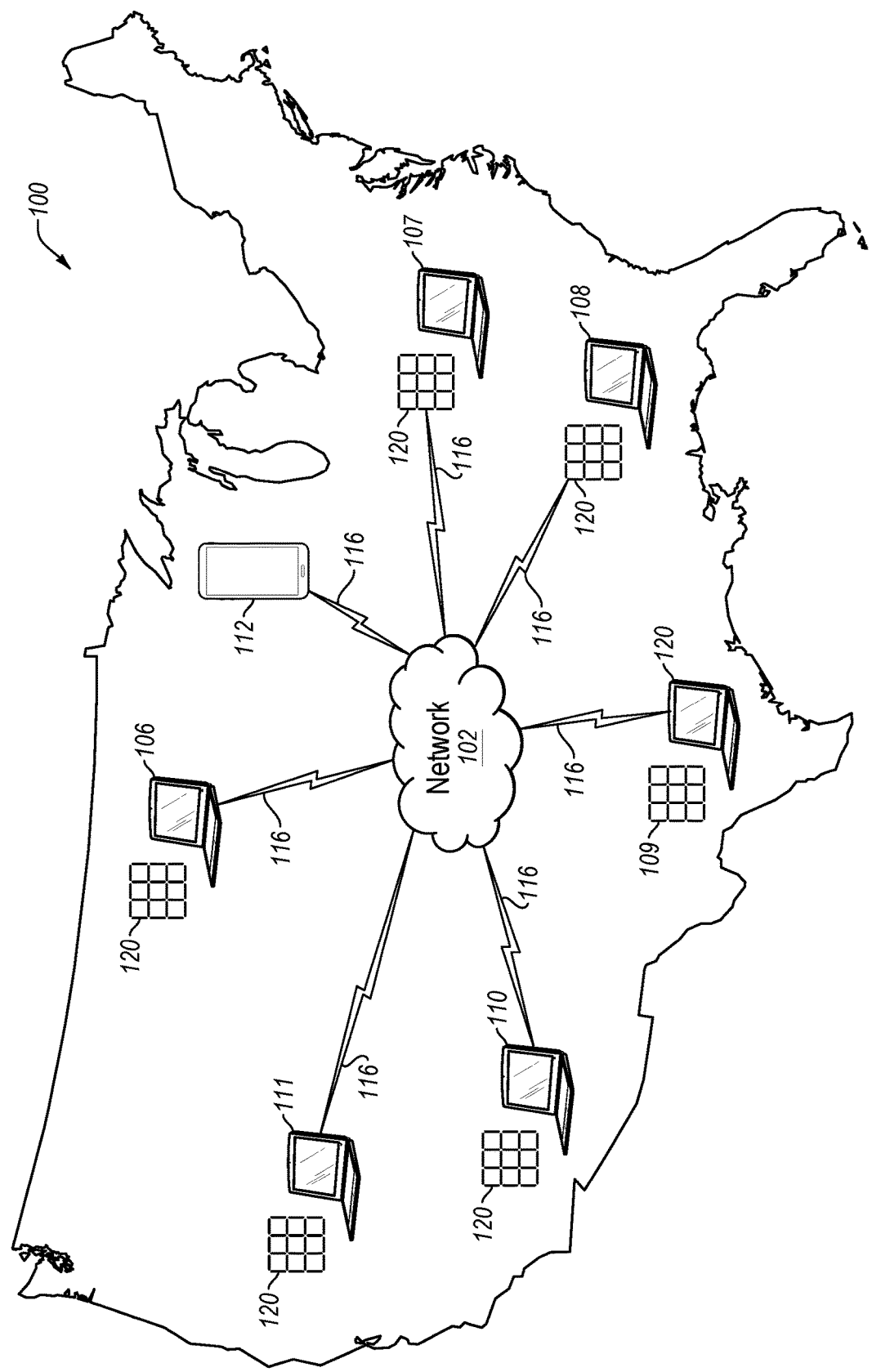
FIG. 1 illustrates an example communications network related to data fetching in data exchange networks.

Some embodiments described in the present disclosure relate to methods and systems related to data fetching in data exchange networks. In some examples, blockchain technology may be used to determine a location in a data exchange network of a nearest copy of requested data in the data exchange network. More specifically, in some examples, blockchain technology may be used to maintain an accurate and current record of a transaction history of data on multiple computing devices. The transaction history may indicate storage devices, such as servers, that are currently storing the data and the location of the storage devices in a data exchange network. Based on the locations of the storage devices in the data exchange network as indicated by the transaction history, a storage device that is storing the requested data and that is closest to a requesting device may be determined. The data may be obtained for the requesting device from the storage device that is storing the requested data and that is closest to the requesting device.

In general, a blockchain is a decentralized, distributed, and publicly-accessible digital ledger used to record transactions across a network of computers. Each of the transactions is linked to a previous transaction in a blockchain and secured using cryptography methods. Each block (i.e., transaction) may contain a cryptographic hash of the previous block, a timestamp, and transaction data. Because each transaction is linked to the transaction before it, the block cannot be altered retroactively without affecting each of the subsequent blocks in the chain and without network consensus. As a result, the blockchain is less susceptible to corruption, errors, and/or manipulation.

As described herein, blockchain techniques are leveraged to record the transaction history of data transactions. As used in this disclosure, data transactions may include the storage, transfer, and/or deletion of data, such as a data file in any format, on storage devices in a data exchange network. Using a blockchain to maintain the data transactions of a data file, i.e., the transaction history, may allow a data exchange network to include an accurate and current location of the data file and/or copies of the data file that is known to all participating devices throughout the data exchange network. Thus, any participating device may know a current and accurate location of a data file to allow the participating devices to access, transfer, and/or delete the data file. Because an accurate and current location of the data file may be known throughout the data exchange network, a data file may be accessed from a storage device that is better situated to provide the data file. The storage device that may be better situated than other storage devices to provide the data file may be determined based on factors such as a location of the storage device in the data exchange network with respect to a requesting device, network congestions, storage device availability, and/or storage device congestion, among other factors. Because a storage device that is better situated to provide a data file may be used to provide the data file, an efficiency, reliability and/or other aspects of the data exchange network may be improved.

FIG. 1 illustrates a diagram representing an example communications network 100 related to data fetching in data exchange networks. The communications network 100 may include network 102 and computing devices 106-112. The network 102 may communicate by way of wired or wireless communication links 116. Each of the computing devices 106-111 may be associated with a blockchain implementation 120. Computing device 112 may be a user device that is connected to the network 102, but may not necessarily be associated with a blockchain implementation.

In FIG. 1, the computing devices 106-112 are shown dispersed throughout the country. While seven example computing devices are shown dispersed throughout the continental United States, the methods described herein are not limited to either the number or the location of the example computing devices. For example, the communications network 100 may be worldwide, countrywide, local, etc. and any number of computing devices may be contemplated.

Each of the computing device 106-112 may be stationary and/or mobile, and may include, but are not limited to a cellular phone; a tablet computer; server computer, a storage device, such as a database or other device that stores data; a wearable electronic device (e.g., a smart watch, a biometric sensor and/or tracker); a personal digital assistant (PDA); a wireless modem; a handheld device; a laptop computer; a wireless local loop (WLL) station; a display device (e.g., a television set, a computer monitor, etc.); a printer; a camera, or any combination of the above. The computing devices 106-112 may also include or be referred to by those skilled in the art as a user device, user equipment, a smartphone, a BLUETOOTH® device, a Wi-Fi device, a mobile station, a subscriber station, a remote unit, a handset, a user agent, a mobile client, a client, and/or some other suitable terminology.

The computing devices 106-112 may be able to communicate through one or more wired and/or wireless connections with various components such as control panels, antennas, base stations, optical network components, and/or network equipment (e.g., servers, wireless communication points, etc.).

The communication links 116 shown in the communication network 100 may wired or wireless connections. For example, when the communication links 116 include wireless connections, the communication links 116 may include uplink (UL) transmissions from the computing devices 106-112 and/or downlink (DL) transmissions from the computing devices 106-112. Each of the communication links 116 may include one or more carriers, where each carrier may be a signal made up of multiple sub-carriers (e.g., waveform signals of different frequencies) modulated according to the various radio or other technologies. Each modulated signal may be sent on a different sub-carrier and may carry control information (e.g., reference signals, control channels, etc.), overhead information, user data, etc. The communications links 116 may transmit bidirectional communications and/or unidirectional communications, including, but not limited to 345 MHz, Wi-Fi, BLUETOOTH®, BLUETOOTH® Low Energy, cellular, Z-WAVE®, millimeter wave, 802.11, peer-to-peer (P2P), local area network (LAN), wireless-local area network (WLAN), Ethernet, firewire, fiber optic, and/or other connection types.

In some embodiments, when the computing devices 106-112 use wireless communications, the computing devices 106-112 may include one or more antennas for employ antenna diversity schemes to improve communication quality and reliability between the control panel and the computing devices. Additionally or alternatively, the computing devices 106-112 may employ multiple-input, multiple-output (MIMO) techniques that may take advantage of multipath, mesh-type environments to transmit multiple spatial layers carrying the same or different coded data.

The computing devices 106-112 may each include memory, a processor, an output, a data input, and a communications component. The processor may be, but is not limited to, a general purpose processor, a Field Programmable Gate Array (FPGA), an Application Specific Integrated Circuit (ASIC), a Digital Signal Processor (DSP), etc. The processor may be configured to retrieve data from and/or write data to the memory.

The memory may be, but is not limited to, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, etc. In some embodiments, the computing devices 106-112 may include one or more hardware-based modules (e.g., FGPA, ASIC, DSP, etc.) and/or software-based modules (e.g., a module of computer code stored at the memory and executed at the processor, a set of processor-readable instructions that may be stored at the memory and executed at the processor) associated with executing an application, such as, for example, receiving, analyzing, transmitting, and/or displaying data from other computing devices.

The processor of the computing devices 106-112 may be operable to control operation of the output of the computing devices 106-112. The output may be a television, a liquid crystal display (LCD) monitor, a cathode ray tube (CRT) monitor, plasma monitor, speaker, tactile output devices (e.g., a capacitive touchscreen device), etc. In some embodiments, the output may be an integral component of each of the computing devices 106-112. For example, the output may be directly coupled to the processor. In some embodiments, an output component may include, but is not limited to, a High Definition Multimedia Interface™ (HDMI) connector, a Video Graphics Array (VGA) connector, a Universal Serial Bus™ (USB) connector, a tip, ring, sleeve (TRS) connectors, and/or any other suitable connector operable to couple the computing devices 106-112 to the output.

Each of the computing devices 106-111 may be associated with a blockchain 120. As described previously, a blockchain is a continuously growing list of blocks. In these and other embodiments, the blockchain 120 may include blocks where each block may represent a data transaction that may occur with respect to data in the network 102. For example, each block in the blockchain 120 may include a name of the data, a location of the data, a summary of the data, such as a hash of the data, and what occurred to the data, e.g., the data is published/added to the network 102, the data is exchanged/transferred from one location to another in the network 102, or the data is removed/deleted from the network 102. In one example, each of the transactions stored in the blockchain 120 may be secured using asymmetric (e.g., public-key) cryptography, where the public key is stored as an address in the blockchain 120. In one example, a network security token may be associated with the public-key address stored in the blockchain 120.

In some embodiments, the blockchain 120 framework used herein may be based on open protocols and standards, and may be implemented using a framework for use-specific modules. In one example, the Hyperledger Fabric network may be used. The Hyperledger Fabric network may be a permission-based blockchain infrastructure that provides modular architecture and may include peer nodes (e.g., the computing devices 106-112) that are enabled to execute chain code, access blockchain data, and endorse transactions.

An example of the implementation of the network 102 is now provided. As provided in this example, the computing devices 106-111 may be considered a server device and computing device 112 may be a requesting device, such as a user device.

In some embodiments, described herein with more details, a data transaction with respect to a particular data file may be performed with respect to network 102 by the computing device 108. For example, the particular data file may be introduced to the network 102 by way of the computing device 108. The particular data file may be stored on the computing device 108. The computing device 108 may create a new block in the blockchain 120 to represent the data transaction of introducing the particular data file in the network 102. Based on the blockchain protocol, the blockchain 120 stored on each of the computing devices 106-111 may be updated with the new block that represents the data transaction of introducing the particular data file. In this example, permissions and access to blockchain 120 may be limited to computing devices 106-111. Thus, storing a transaction in blockchain 120, as well as retrieving the recordation of transactions in blockchain 120, may be limited only to those computing devices that have been previously granted permission (i.e., computing devices 106-111).

After the particular data file is stored on the computing device 108, the particular data file may be transferred to the computing device 110 and deleted from the computing device 108. The computing device 108 and/or the computing device 110 may create one or more new blocks in the blockchain 120 to represent the data transaction of transferring and deleting the particular data file in the network 102. Based on the blockchain protocol, the blockchain 120 stored on each of the computing devices 106-111 may be updated with the new block(s) that represents the data transaction of transferring and deleting the particular data file.

After the particular data file is stored on the computing device 110, the particular data file may be copied and transferred to the computing device 106, such that the particular file is stored on the computing device 106 and computing device 110. The computing device 106 and/or the computing device 110 may create one or more new blocks in the blockchain 120 to represent the data transaction of copying and transferring the particular data file in the network 102. Based on the blockchain protocol, the blockchain 120 stored on each of the computing devices 106-111 may be updated with the new block(s) that represents the data transaction of transferring and copying the particular data file.

After the particular data file is stored on the computing device 106, the computing device 112 may request access to the particular data file. The computing device 112 may request access from one of the computing devices 106-111 that maintain the blockchain 120, for example, the computing device 107. The computing device 107 may access the blockchain 120 and determine the blocks in the blockchain 120 that pertain to the data transactions of the particular data file. Using the data transactions of the particular data file, the computing device 107 may determine if the particular data file is stored by one of the computing devices 106-111. If the particular data file is stored by one of the computing devices 106-111, the computing device 107 may determine the locations at which the particular data file is stored. Thus, the computing device 107 may determine that the particular data file is stored at computing device 106 and the computing device 110. The computing device 107 may inform the computing device 112 of the locations to allow the computing device 112 to request the particular data file. Alternatively or additionally, the computing device 107 may request the particular data file.

In some embodiments, the computing device 107 may determine a location that is nearest to the computing device 112. The nearest location may be based on physical distance. Alternatively or additionally, the nearest location may be based a nearest network location that may be determined based on factors that include a number of network hops, network bandwidth, and/or network congestion between the requesting and provided devices. In these and other embodiments, the computing device 107 may request the particular data file from the nearest location and provide the particular data file to the computing device 112.

Modifications, additions, or omissions may be made to FIG. 1 without departing from the scope of the present disclosure. For example, the communication network 100 may include more or fewer elements than those illustrated and described in the present disclosure. Alternatively or additionally, each of the computing device 106-111 may not store data files and may not be associated with the blockchain 120. In these and other embodiments, some of the computing device 106-111 may be storage devices and other of the computing device 106-111 may be associated with the blockchain 120. The other of the computing device 106-111 associated with the blockchain 120 may direct transactions of data files and update the blockchain 120 accordingly. In these and other embodiments, directing transactions of the data files may include indicating publishing of the data files to the storage devices, exchanging of the data files between the storage devices, removal of the data files from the storage devices, and handling request for the data files from other devices such as the computing device 112.

Figure 2:
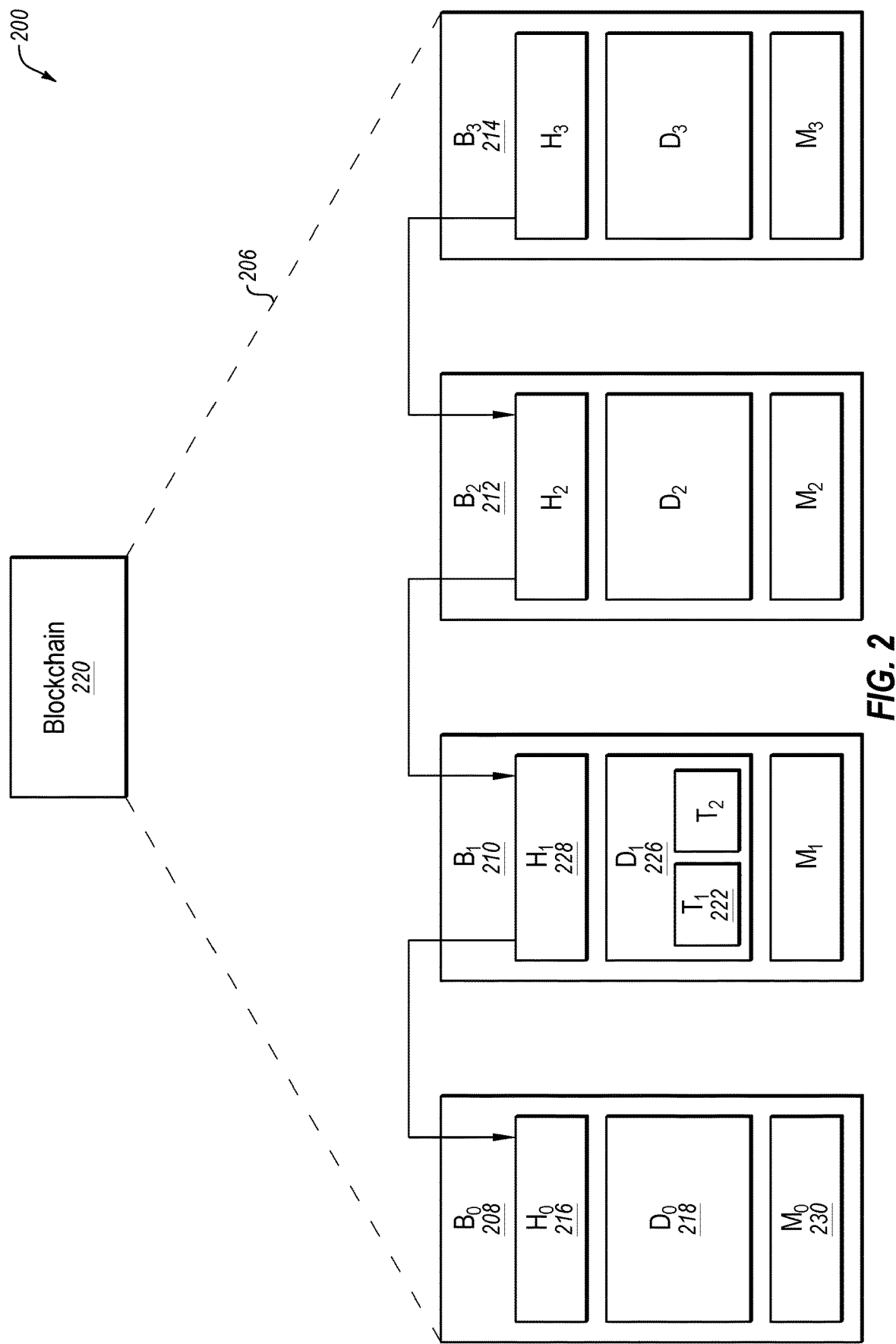
FIG. 2 illustrates a block diagram of an example embodiment related to data fetching in data exchange networks.

FIG. 2 illustrates a block diagram 200 of an example embodiment of a blockchain 220 related to data fetching in data exchange networks. A more detailed view 206 of the blockchain 220 is shown with reference to FIG. 2. As illustrated, blockchain 220 is a transaction log of hash-linked blocks, with each block containing at least one data transaction. The header of each block includes a hash of the block's transactions, as well as a hash of the prior block's header. As a result, all transactions on the blockchain 220 are sequenced and cryptologically linked together. In some embodiments, the blockchain 220 may be stored locally on every device, such as on each of the computing devices 106-111 of FIG. 1. As a result, every device may have the same copy of the entire transaction history of data files in the data exchange network.

For example blockchain 220 shows blocks 208, 210, 212, and 214. Using block 208 as an example, each of the blocks has a block header 216, block data 218, and block metadata 230. Block 208 may be the first block in the blockchain, and thus may not have an associated transaction to link block 208 to a previous block; however, block 210 includes example data transaction 222. Each block's header includes a hash of the block's transactions, as well as a copy of the hash of the prior block's header (shown by line 224).

In one example, a computing device may initiate a transaction, such as example data transaction 222. The data transaction 222 may add data to the block 210, which in turn is appended to block 208 to create the first two blocks of the blockchain 120. Each data transaction may be represented as a key-value pair. The key-value pair may include a "key" field and a "value" field. In some embodiments, the "key" field may be the name of the block data 218. Alternatively or additionally, the key field may be the name of the data file for which the data transaction occurred.

In one embodiment, the key (i.e., data name) may be unique to a data file. For example, the same data may have the same key (i.e., data name). In this embodiment, the methods described herein may benefit from a standardized naming policy agreed upon by all permissioned devices of the blockchain 220. With a standard naming policy, each of the devices (e.g., data owners) may have access to all of the transactions related to a specific set of data and may request a specific set of data.

In an additional or alternative embodiment, the key (i.e., data name) may not be unique. For example, the same data may have a different key (i.e., data name). In this embodiment, a device may only retrieve the transactions having the same data name as the key. However, a device cannot obtain all of the locations where the data file may be stored because the data file is stored with a different name different locations.

The "value" field may include different information based on the type of the data transaction. For example, the data transaction may include data publishing, exchange, and removal. Data publishing may include an original data owner introducing new data to the network 102. Data exchange may include the data is being transferred from one location to another location; in other words, the data may have more than one owner. Data removal may include that a data owner has deleted the data.

In these and other embodiments, when the data transaction relates to exchange of the data file, the "value" field may include the sender information (sender address), the receiver information (receiver address), and a hash value of the data file. Alternatively or additionally, when the data transaction relates to publishing of the data file, the "value" field may include the provider information (address of the device adding the data file to the network), an indication that the data file is being added, and a hash value of the data file. Alternatively or additionally, when the data transaction relates to deleting of the data file, the "value" field may include the deletion information (address of the device deleting the data file from the network), an indication that the data file is being delete, and a hash value of the data file.

An example of a key-value pair for data transaction 222 for the exchange of the data file may be illustrated by:

(key)
Name of Data (/Fujitsu/Device_Manual/PC2210)
(value)

-continued

From: A1 (111.1.1.2)
To: C1 (200.1.1.3)
Hash of Data (2fd4e1c67a2d28fced849ee1bb76e7391b93eb12)

The data transaction history including the value data, e.g., when the data is published, exchanged, and deleted, allows a data exchange network to know if a data file is stored on the data exchange network such that the data file may be accessed. Additionally, when the data is stored on the data exchange network, the data transaction history including the value data allows the data exchange network to know each location of the data file. Because the data transaction history is stored in a blockchain, each device in the data exchange network has a current history of all data files stored in the data exchange network. Each device in the data exchange network having a current history of all data files stored in the data exchange network may provide for increased data exchange network efficiency including accessing a data file from a nearest network location.

In an embodiment where the Hyperledger Fabric implementation is being used, "chaincode" may be a program that executes on top of the blockchain to implement the logic of how applications interact with the blockchain 220. For example, when a transaction is proposed, the proposal triggers chaincode that decides what state change should be applied to the blockchain 220. For example, in one example chaincode embodiment, "stub.PutState( )" may be used to store the transaction details for each transaction in the internal key-value pair. In addition "stub.GetState" may be used, with the data name as the key, to retrieve the latest transaction associated with a key in the query. Further, "GetHistoryForKey( )" may be used to obtain a history of the transactions across a period of time.

An example of accessing the blockchain 220 is now provided. A computing device may want a copy of a data file stored on a data exchange network. A transaction history of data transactions regarding the data file may be stored in the blockchain 220 which may be part of the data exchange network. The computing device may make a request to the data exchange network for the data file. Data transactions in the blockchain 220 may be associated with the requested data file based on a key-value pair derived from the data file. For example, the key of the key-value pair may be the name of the requested data file and the value of the key-value pair may include a hash of the requested data file. In response to the data request, the transaction history of the requested data file may be accessed based on the name of the requested data file. After accessing the transaction history, the transaction history may be checked by the chaincode to determine the nearest location of the requested data file.

In one embodiment, the chaincode may use a software utility such as PING to determine the nearest location of the requested data file. In these and other embodiments, using PING to determine the nearest location includes determining the round-trip time (RTT) to send a message from the originating computing system to a destination computing system that is then returned to the originating computing system. For example, turning back to FIG. 1, if the data request originates from computing device 112, the chaincode may determine the RTT to reach computing devices 110, 106, 108, etc., and return to computing device 112. In these and other embodiments, the nearest location may be the location with the smallest RTT.

In another embodiment, the chaincode may use TRACEROUTE to determine the nearest location of the requested data. In these and other embodiments, using TRACEROUTE to determine the nearest location includes determining the route of a message, such as a number of network hops, as well as the transit delay of packets across the network. In these and other embodiments, the nearest location may be the location with fewest network hops and/or the smallest transit delays.

Figure 3A:
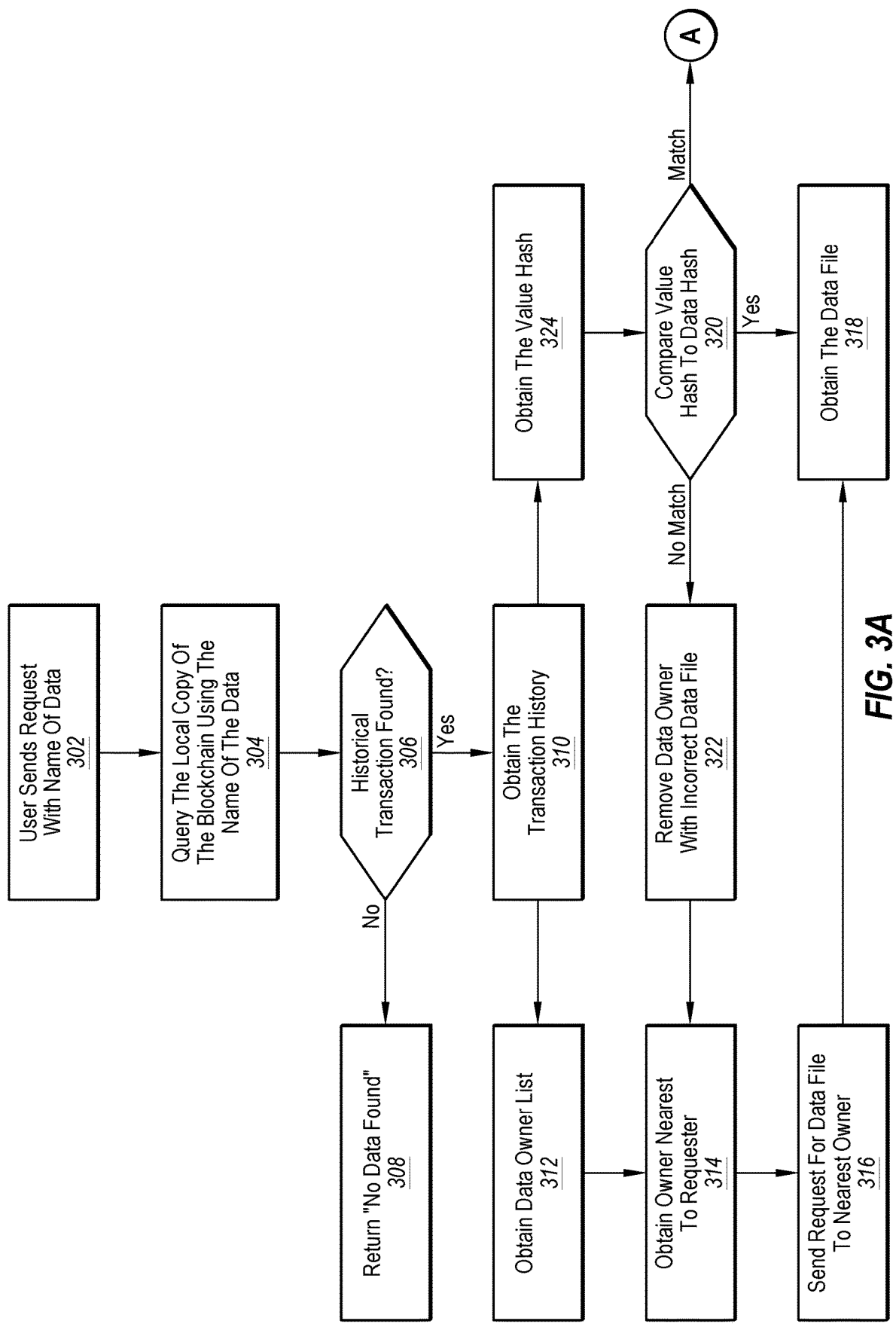
FIGS. 3A and 3B illustrate a flowchart of an example method related to data fetching in data exchange networks.
Figure 3B:
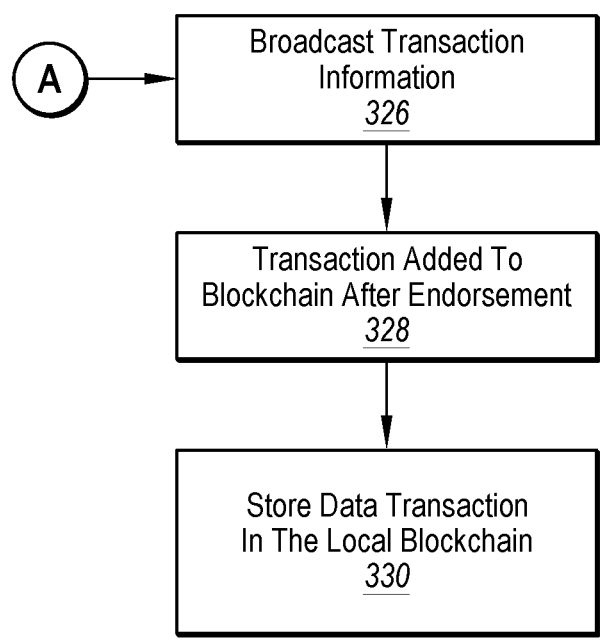

FIGS. 3A and 3B illustrate a flowchart of an example method 300 related to data fetching in data exchange networks. The method 300 may be performed, in some embodiments, by a device or system, such as one or more of the computing devices of FIG. 1 or the computer system 500 of FIG. 5, or another device or system. In these and other embodiments, the method 300 may be performed based on the execution of instructions stored on one or more non-transitory computer-readable media. Although illustrated as discrete actions, various actions may be divided into additional actions, combined into fewer actions, or eliminated, depending on the desired implementation.

At action 302, a computing device may send a request for a data file. The request may include a key, where the key is the name associated with the data file. The request may be sent to a network device of a data exchange network that includes a local copy of a blockchain that includes transaction histories of data transactions of data files stored on the data exchange network. The blocks in the blockchain may have key-value pairs, where the key may be the names of the data files stored on the data exchange network. Note that the request includes the key, i.e., the name of the data file. The request may not include an internet protocol address or other identifier of a network device that stores the data file. Rather, as discussed with respect to the method 300, the information of the network device that stores the data file is obtained from a blockchain of transactions associated with the data file that is requested.

At action 304, the network device queries the local copy of the blockchain on the network device using the key received with the request. In one embodiment, the local copy of the blockchain may be stored in a database on the network device. In these and other embodiments, the database may be CouchDB. CouchDB is provided as an example database, any database software may be used to store the local copy of the blockchain.

At action 306, it is determined whether the history transaction of the requested data file is found in the blockchain. If not, then at action 308, the requester is informed that no data has been found. If so, then at action 310, the method obtains the transaction history for the received key (i.e., the data name). The transaction history may include multiple blocks in the blockchain with a key that matches the received key. The values for each of the multiple blocks may also be obtained.

At action 312, a list of all of the data owners of the data file is retrieved from the values of each of the blocks in the transaction history. The data owners may be other network devices in the data exchange network At action 314, obtain which of the data owners is the nearest to the requesting device. In some embodiments, Ping and/or Traceroute, or other contemplated methods may be used to determine the nearest data owner. In some examples, "nearest" may be the computing device physically nearest to the requesting device, however, in other examples "nearest" may be the nearest based on network parameters such as bandwidth, latency, etc.

At action 316, after the nearest owner is determined, a request for the data file is sent to the nearest data owner from the network device. At action 318, in response to the request for the data file, the data file may be obtained at the network device from the data owner. Alternatively or additionally, a data hash of the data file may be generated. The hashing algorithm used may be the same as the hashing algorithm used to generate the hash of the data file that is stored in the key-value pair related to the data file in the block chain.

At action 324, the value hash in the value of the key-value pair that included the address of the nearest data owner from which the data file was requested may be obtained. At action 320, the value hash from the value of the key-value pair may be compared to the data hash that was generated using the data file obtained from the nearest data owner by the network device. If the hashes are not the same, it may be determined that the data file obtained from the nearest owner is not the data file associated with the obtained key-value and thus not the requested data file. At action 322, the data owner with the incorrect data file is removed from the list of data owners that include the data file as determined in action 312. After action 322, action 314 is performed again to determine the nearest data owner after the removal of the data owner that did not include the data. After the nearest data owner after the removal of the data owner that did not include the data is determined, the method 300 continues as discussed.

If, at action 320, the hashes do match then the data transaction information associated with the network device obtaining the data file from the data owner is broadcast to other network devices in the data exchange network at action 326 for endorsement by the other network devices. The data transaction may indicate that the network device may now include a copy of the data file. The data file is also provided to the requesting computing device by the network device.

At action 328, the data transaction is endorsed (e.g., approved) by the other network devices. After the data transaction is approved, the data transactions is added to the blockchain. At action 330, in response to the data transaction being endorsed, a local copy of the blockchain stored by each of the network devices of the data exchange network is updated to include the new block in the blockchain for the data transaction.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
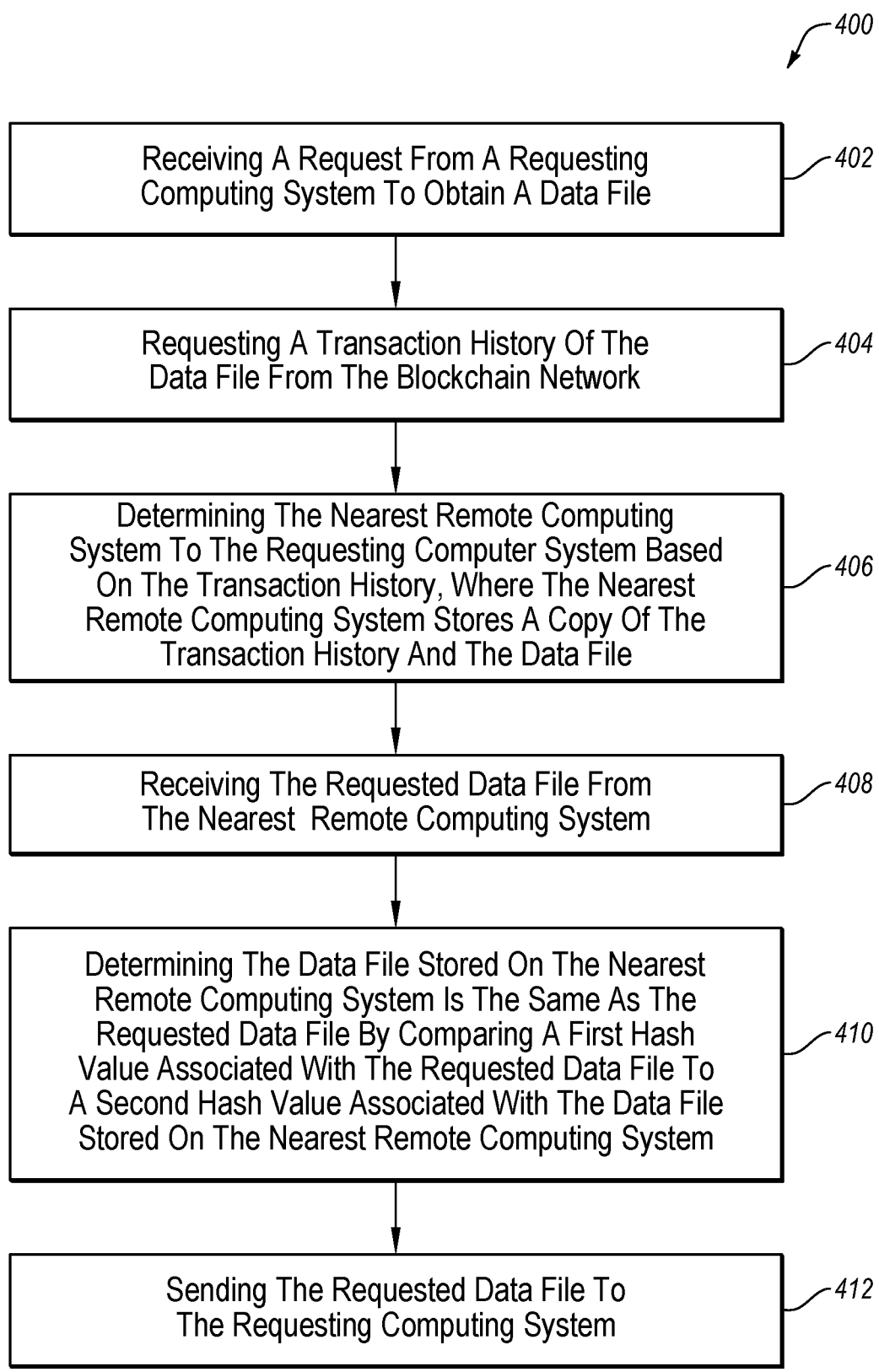
FIG. 4 illustrates a flowchart of an example method related to data fetching in data exchange networks.

FIG. 4 illustrates a method 400 of a time-based verification system in accordance with at least some embodiments. The method 400 may be performed, in some embodiments, by a device or system, such as one or more of the computing devices of FIG. 1 or the computer system 500 of FIG. 5, or another device or system. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

At block 402, the method may include receiving a request to obtain a data file from a nearest remote computing system in a blockchain network, the nearest remote computing system being nearest to a requesting computing system.

At block 404, the method may include requesting a transaction history of the data file from the blockchain network.

At block 406, the method may include determining the nearest remote computing system to the local computing device based on the transaction history, where the nearest remote computing system stores a copy of the transaction history and the data file.

At block 408, the method may include receiving the requested data file from the nearest remote computing system.

At block 410, the method may include determining the data file stored on the nearest remote computing system is the same as the requested data file by comparing a first has value associated with the requested data file to a second hash value associated with the data file stored on the nearest remote computing system.

At block 412, the method may include sending the requested data file to the requesting computer system The method 400 may improve the efficiency and efficacy of nearest data fetching in data exchange networks enabled by blockchain technology. For example, wireless communication and data transfer between two nearer computing systems may reduce bandwidth consumption, reduce transmission times, reduce power consumption, and the like.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In some embodiments, the fact that the transaction history stored in blockchain 120 cannot be modified provides an accurate data transaction history that also provides an accurate account of the locations where data may be stored. Because each user associated with the blockchain 120 stores the transaction history locally, the request for data is not subject to querying a centralized database located far from the requester. In this sense, the requester can quickly know whether the requested data is available, where it is, and quickly obtain it.

Figure 5:
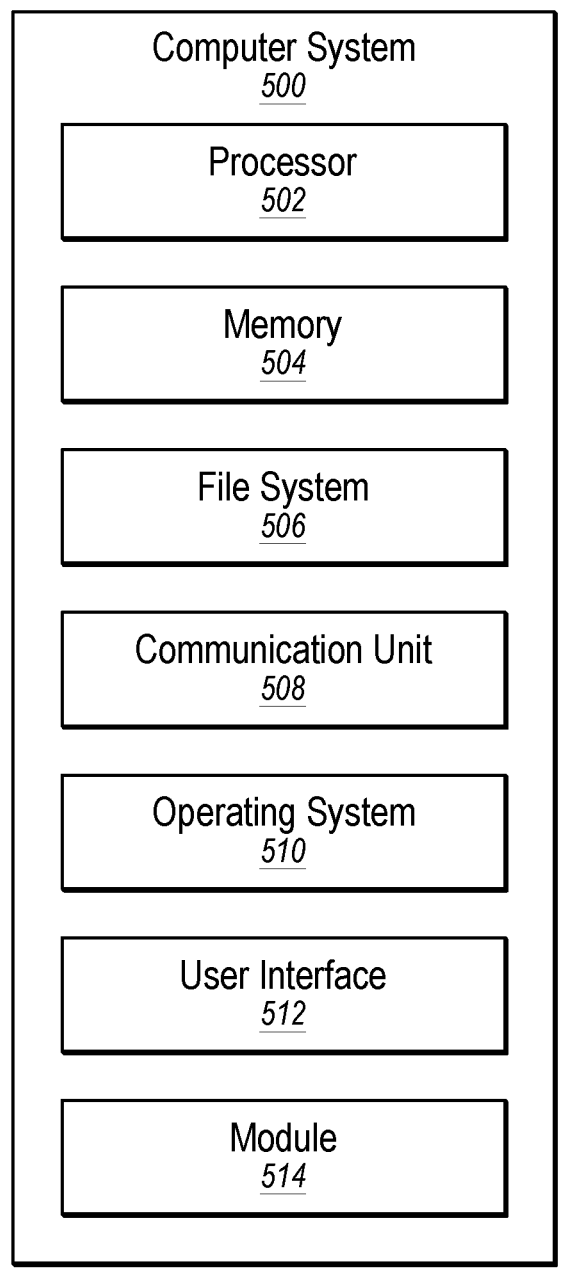
FIG. 5 illustrates a system related to data fetching in data exchange networks.

FIG. 5 illustrates a system related to data fetching in data exchange networks. In some embodiments, the computer system 500 may be part of any of the systems or devices described in this disclosure. For example, the computer system 500 may be any of the computing devices 106-112.

The computer system 500 may include a processor 502, a memory 504, a file system 506, a communication unit 508, an operating system 510, a user interface 512, and a module 514, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 502 may include any suitable special-purpose or general-purpose computer, computing entity, or processing device including various computer hardware or software modules and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more of the actions of the methods 300 and/or 400 described with reference to FIGS. 3 and 4, respectively.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more of the actions of the methods 300 and/or 400 of FIGS. 3 and 4, respectively.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The module 514 may be one or more computer-readable instructions stored on one or more non-transitory computer-readable media, such as the memory 504 or the file system 506, that, when executed by the processor 502, is configured to perform one or more of the actions of the methods 300 and/or 400 of FIGS. 3 and 4, respectively. In some embodiments, the module 514 may be part of the operating system 510 or may be part of an application of the computer system 500, or may be some combination thereof.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy, or a virtualization environment. Further, as indicated above, embodiments described herein may be implemented using computer-readable media (e.g., the memory 504 or file system 506 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. As an aid to understanding, the following appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   receiving a request to obtain a data file from a nearest remote computing system in a blockchain network, the nearest remote computing system being nearest to a requesting computing system;
   requesting a transaction history of the data file from the blockchain network, the transaction history including a first hash value of the data file;
   determining the nearest remote computing system to the requesting computing system based on the transaction history, where the nearest remote computing system stores a copy of the transaction history and the data file;
   receiving the requested data file from the nearest remote computing system;
   determining the data file stored on the nearest remote computing system is the same as the data file identified in the transaction history by comparing the first hash value from the transaction history to a second hash value of the data file stored on the nearest remote computing system; and
   in response to determining the data file stored on the nearest remote computing system is the same as the data file identified in the transaction history, sending the requested data file from the nearest remote computing system to the requesting computing system.

2. The method of claim 1, receiving the request to obtain the data file further comprises: receiving a name associated with the data file.

3. The method of claim 2, further comprising: obtaining a key-value pair from a locally stored copy of a blockchain, wherein the received name matches a key of the key-value pair.

4. The method of claim 1, wherein requesting the transaction history further comprises: obtaining one or more data owners of the data file stored on the nearest remote computing system.

5. The method of claim 1, wherein determining the nearest remote computing system further comprises: determining a round-trip time (RTT) to the nearest remote computing system in the blockchain network.

6. The method of claim 1, wherein determining the nearest remote computing system further comprises: determining a number of hops to reach the nearest remote computing system.

7. The method of claim 1, further comprising: broadcasting the transaction history to the blockchain network after receiving the data file.

8. The method of claim 7, wherein broadcasting the transaction history further comprises:
adding an updated transaction associated with receiving the data file from the nearest remote computing system to the transaction history; and
storing an updated copy of the transaction history on each remote computing device associated with the data file.

9. The method of claim 1, wherein in response to the data file stored on the nearest remote computing system being determined not to be the same as the data file identified in the transaction history, the method further comprises:
determining another remote computing system based on the transaction history, where the other remote computing system stores a copy of the transaction history and the data file; and
receiving the data file from the other remote computing system.

10. An apparatus, comprising:
a processor implemented by hardware;
memory in electronic communication with the processor; and
instructions stored in the memory, the instructions being executable by the processor to cause the apparatus to perform operations comprising:
receiving a request to obtain a data file from a nearest remote computing system in a blockchain network, the nearest remote computing system being nearest to a requesting computing system;
requesting a transaction history of the data file from the blockchain network, the transaction history including a first hash value of the data file;
determining the nearest remote computing system to the requesting computing system based on the transaction history, where the nearest remote computing system stores a copy of the transaction history and the data file;
receiving the data file from the nearest remote computing system;
determining the data file stored on the nearest remote computing system is the same as the data file identified in the transaction history by comparing the first hash value from the transaction history to a second hash value of the data file stored on the nearest remote computing system; and
in response to determining the data file stored on the nearest remote computing system is the same as the data file identified in the transaction history, sending the file from the nearest remote computing system to the requesting computing system.

11. The apparatus of claim 10, wherein when the processor receives the request to obtain the data file, the instructions are further executable by the processor to cause the apparatus to perform operations comprising: receiving a name associated with the data file.

12. The apparatus of claim 10, wherein when the processor requests the transaction history, the instructions are further executable by the processor to cause the apparatus to perform operations comprising: obtaining one or more data owners of the data file stored on the nearest remote computing system.

13. The apparatus of claim 10, wherein when the processor determines the nearest remote computing system, the instructions are further executable by the processor to cause the apparatus to perform operations comprising: determining a round-trip time (RTT) to the nearest remote computing system in the blockchain network.

14. The apparatus of claim 10, wherein when the processor determines the nearest remote computing system, the instructions are further executable by the processor to cause the apparatus to perform operations comprising: determining a number of hops to reach the nearest remote computing system.

15. The apparatus of claim 10, the instructions further executable by the processor to cause the apparatus to perform operations comprising:
broadcasting the transaction history to the blockchain network after sending the data file.

16. The apparatus of claim 15, wherein when the processor broadcasts the transaction history, the instructions are further executable by the processor to cause the apparatus to perform operations comprising:
adding an updated transaction associated with receiving the data file from the nearest remote computing system to the transaction history; and
storing an updated copy of the transaction history on each remote computing device associated with the data file.

* * * * *